US006677888B2

(12) United States Patent  (10) Patent No.: US 6,677,888 B2
Roy  (45) Date of Patent: Jan. 13, 2004

(54) SECURE AIRCRAFT COMMUNICATIONS ADDRESSING AND REPORTING SYSTEM (ACARS)

(75) Inventor: Aloke Roy, Gaithersburg, MD (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/215,730

(22) Filed: Aug. 9, 2002

(65) Prior Publication Data

US 2003/0030581 A1 Feb. 13, 2003

Related U.S. Application Data

(60) Provisional application No. 60/311,039, filed on Aug. 9, 2001.

(51) Int. Cl.[7] ........................... G01S 13/00; G01S 13/08
(52) U.S. Cl. .......................................... 342/36; 342/51
(58) Field of Search ...................... 342/36–40, 42–51, 342/195; 370/212; 375/253

(56) References Cited

U.S. PATENT DOCUMENTS 5,543,798 A * 8/1996 Schuermann ................ 342/42
6,058,186 A * 5/2000 Enari .......................... 380/217

OTHER PUBLICATIONS

Secure aircraft communications addressing and reporting system (ACARS) Roy, A.; Digital Avionics Systems, 2001. DASC. The 20th Conference, vol.:2, Oct. 14–18, 2001 pp.: 7A2/1–7A2/11 vol. 2.*
Experimental encryption of aircraft communications addressing and reporting system (ACARS) aeronautical operational contro messages Risley, C.; McMath, J.; Payne, B.; Digital Avionics Systems, 2001. DASC. The 20th Conference , Vol:2, Oct. 14–18, 2001.*

* cited by examiner

Primary Examiner—Thomas H. Tarcza
Assistant Examiner—Brian K Andrea
(74) Attorney, Agent, or Firm—Charles J. Rupnick (57) ABSTRACT

A method and apparatus that permit military aircraft operators to use the civilian Aircraft Addressing and Reporting System (ACARS) technology while ensuring data security.

27 Claims, 5 Drawing Sheets

| FIELD NAME | SOH | MODE | A/C REGISTRATION # | ACK/NAK | LABEL | UBI | STX |
|---|---|---|---|---|---|---|---|
| SIZE (BYTES) | 1 | 1 | 7 | 1 | 2 | 1 | 1 |
| EXAMPLE |  | 2 | .N123XX |  | H1 | A |  |
| MESSAGE HEADER REQUIRED BY DSP FOR MESSAGE DELIVERY AND ROUTING (UNPROTECTED) | | | | | | | |

6-2:

| USER DATA TEXT |
|---|
| 0 TO 220 |
| -UPLINK TEXT |
| USER DATA THAT CAN BE PROTECTED |

| FIELD NAME | SOH | MODE | A/C REGISTRATION # | ACK/NAK | LABEL | UBI | STX |
|---|---|---|---|---|---|---|---|
| SIZE (BYTES) | 1 | 1 | 7 | 1 | 2 | 1 | 1 |
| EXAMPLE |  | 2 | .N123XX |  | Q5 | A |  |
| MESSAGE HEADER REQUIRED BY DSP FOR MESSAGE DELIVERY AND ROUTING (UNPROTECTED) | | | | | | | |

7-2:

| MESSAGE SEQUENCE NUMBER | AGENCY ID | FLIGHT # | USER DATA TEXT |
|---|---|---|---|
| 4 | 2 | 4 | 0 TO 210 |
| M01A | AA | 1234 | DOWNLINK TEXT |
| USER DATA THAT CAN BE PROTECTED | | | |

SECURE AIRCRAFT COMMUNICATIONS ADDRESSING AND REPORTING SYSTEM (ACARS)

This application claims the benefit of U.S. Provisional Application Ser. No. 60/311,039, filed in the name of Aloke Roy on Aug. 9, 2001, the complete disclosure of which is incorporated herein by reference.

Federally sponsored research or development: This invention relates to work done as part of the Dual Use Science and Technology (DUS&T) program under US Air Force Research Laboratory Agreement No. F33615-01-21808.

FIELD OF THE INVENTION

The present invention relates to aircraft to ground communications devices and methods, and in particular to a secure data link between an aircraft and the ground based on Aircraft Addressing and Reporting System (ACARS) technology.

BACKGROUND OF THE INVENTION

Aircraft Addressing and Reporting System (ACARS) data link is used by commercial airlines worldwide for their day to day operations. Civil Aviation Agencies use ACARS for air traffic control (ATC) over oceanic regions where radar coverage is not available. Automated position reports transmitted via ACARS permit air/traffic controllers to accurately monitor the position of aircraft. In addition, controllers can send Air Traffic Management (ATM) messages to the pilot to actively control aircraft movement. As such, ACARS has been a key contributor in reducing separation standards over the oceanic air space.

ACARS messages are transferred over open RF channels in human readable forms. Low cost, COTS equipment enables anyone to monitor and process ACARS messages. It is possible to determine aircraft type, condition, position, projected track, cargo content, and operational details of the flight by analyzing ACARS messages. Aircraft operators would like to protect this information to maintain competitive advantage, to ensure safety of flight and to reduce operational liability.

Normally, US military aircraft are required to comply with the air-traffic requirements while flying in the civil air space. Since ACARS is used for air traffic control in the South Pacific region, the US Air Force (USAF) has started to equip its air transport fleet with ACARS to satisfy civil aviation requirements. Availability of ACARS also offers additional benefit to the USAF because ACARS can be used for routine, unclassified communications, thereby preserving the capacity of military communication systems for high priority traffic. There is a long felt need for military operators to use the existing civilian ACARS system in a secure manner. If messages can be exchanged over ACARS in a secure fashion, ACARS data link will allow USAF to track its fleet in near-real time and exchange information with any aircraft worldwide, thereby improving its operational efficiency.

Some commercial airlines have implemented ad-hoc data encryption techniques for ACARS. These techniques use simple character substitution algorithms that may protect the information from a casual hacker, but a sophisticated attacker will be able to break the code in a short period of time with nominal computational resources. As such, airlines and the military desire to develop a strong information security solution for ACARS that is standards-based and uses cryptographic algorithms that have been validated by the industry.

Furthermore, at present, air traffic is controlled in a given airspace by voice communications between the pilot and the controller. With continuous increase in the number of flights around the world, radio frequencies used for air traffic control communications are nearing saturation. Channel congestion is affecting the reliability of voice communications and reducing safety of flight. The channel congestion problem is compounded by the fact that system capacity can not be readily increased by adding frequencies because spare frequencies are not available in several regions. Future Air Navigation Systems (FANS) committee of the International Civil Aviation Organization (ICAO) has identified digital communications over data link as the only solution to meet future demand for air traffic control communications. ICAO developed a set of standards, called the Aeronautical Telecommunications Network (ATN) to facilitate the implementation of this digital communication system. See, e.g., International Civil Aviation Organization, *CNS/ATM PACKAGE-1 STANDARDS AND RECOMMENDED PRACTICES* (SARPs), ICAO (1997), document 9705, Montreal, Canada, which is incorporated herein by reference. Eurocontrol, other civil aviation organizations, and US Federal Aviation Administration (FAA) are in the process of migrating to ATN.

Current measures of information security will become obsolete with the paradigm shift from voice based air traffic control to automated air traffic management using data link. ICAO has determined that denial of service, masquerade, and modification of information are the primary safety threats to ATM. See, e.g., Adnams, Martin, *OVERALL SECURITY CONCEPT.* ATNP/VG-1 WP6-11, Halifax, Canada, Eurocontrol, (1996), which is incorporated herein by reference. ICAO developed the ATN security solution based on Public Key Infrastructure (PKI) to mitigate these threats. See, McParland, Thomas, *CNS/ATM PACKAGE-II STANDARDS AND RECOMMENDED PRACTICES (SARPS), SUB-VOLUME VIII—ATN SECURITY SERVICES*, Draft, Tokyo, Japan, ICAO, (2001),which is incorporated herein by reference. In addition, ICAO is planning to mandate a sunrise date after which all ATM systems communicating via data link will be required to implement the ATN security standards.

The ACARS aeronautical data communications protocol is character based. As such, special characters are reserved and used as protocol delimiters. This limits the type of data that can be transported over the ACARS network as the reserved characters can not be present in user data stream. ACARS defines some escape sequences and special encoding schemes to transmit bit-oriented user data over ACARS to ensure that the reserved characters are not contained within the payload user data. This encoding scheme increases the size of the payload. For bit-oriented data, the payload size is doubled after applying ACARS encoding algorithm. ACARS communications frequencies are nearing saturation. Therefore, doubling the payload significantly reduces the number of users that can be supported by ACARS network. Secure communications technology is being developed for ACARS which will allow users to encrypt user data before transmission over ACARS network. Unfortunately, the encryption algorithms are likely to convert the user data from characters to bits which then have to be encoded again into characters for use with the character-based ACARS protocol, thereby doubling the size of the payload. As the customers are charged by the number of bits sent over ACARS, the developing security solution will double the costs of communications.

SUMMARY OF THE INVENTION

With the increase in automation, airlines, military, and civil aviation organizations are relying on ACARS for air traffic and operational control. Unfortunately, automated information exchange between airborne and ground computers also increases the vulnerability of the system and may severely impact the safety of a flight or an air space.

The Secure ACARS solution of the invention protects the aeronautical information transfer end-to-end over the ACARS data link using proven, state-of-the-art, standard-based, cryptographic techniques.

This invention provides specific techniques to relieve ACARS frequency saturation using an unique encoding/decoding scheme combined with standard data compression algorithm. Additional solutions are provided to encrypt the ACARS protocol header without requiring any changes to the legacy ACARS equipment. The secure ACARS solutions of the invention satisfy customer needs, improve the safety and reliability of the ACARS system and extend the usability of ACARS by conserving RF resources.

The secure ACARS solution of the invention is based on the ICAO ATN security standards, which has been extended to cover data encryption. Therefore, systems and policies developed to provide ACARS security can be used for ATN. Thus, the ACARS security solution of the invention protects investment in existing ACARS while satisfying known information security needs of both commercial and military users.

This invention proposes to modify ACARS data flow process to add compression/decompression capability. Although ACARS will benefit from any compression technique, use of DEFLATE algorithm (specified in Internet RFC 1951) and ITU-T standard V.42bis are recommended. Studies conducted during ATN specification development proved that the DEFLATE algorithm can compress an arbitrary stream of data and reduce its size by a factor of two to five. Therefore, use of the DEFLATE algorithm on ACARS user data will, in the worst case, yield the same size payload, after encryption, as the original. In addition to the standard compression techniques, an unique encoding and decoding scheme has been developed as part of this compression proposal. This new encoding/decoding scheme replaces the standard ACARS bit-to-character encoding scheme as ACARS encoding doubles the size of bit-oriented user data.

The compression scheme of the invention is as follows: If user data is character-based, encode user data into a bit stream which packs each 8-bit character data into a 6-bit representation, which is formed of the 6-bit representations concatenated into a single bit stream. This "packing" compresses user data by 25 percent. If user data is bit-oriented, this packing is not performed. A standard compression algorithm is applied to the resulting concatenated bit stream. Any standard compression technique may be used on the concatenated bit stream. The known DEFLATE algorithm or v.42bis algorithm referenced herein yield relatively good results when that user data size is small. Application of one of these standard compression techniques can reduce the bit stream by as much as 25 to 33 percent depending on the size of the data. The standard compression techniques are more effective on larger bit streams. The resulting compressed bit stream is optionally encrypted/authenticated according to user preference. The encryption/authentication process adds nothing to the size of the compressed bit stream. The resulting concatenated and compressed bit stream is encoded by converting each 6-bit user data into a 8-bit ACARS character. This encoding scheme ensures that the output characters are of a type that is approved for transmission over the ACARS network. This encoding scheme expands the bit stream by 33 and ⅓ percent (thirty-three and one-third percent). However, the size of bit-oriented user data is no larger than the original character-oriented user data, and may be smaller depending upon the effectiveness of the compression algorithm applied to the bit stream. The standard ACARS bit-to-character encoding scheme, shown in FIG. 4 that doubles the size of bit-oriented user data, is thus by-passed by the secure ACARS solution of the invention.

Figure 4:
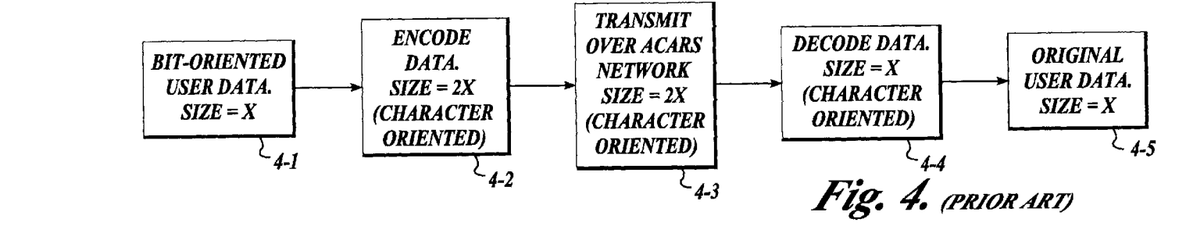
FIG. 4 is a chart that illustrates the effect of the ARINC 622 encoding algorithm on ACARS data flow.

The resulting character-stream is sent to the peer entity via the ACARS network, as shown in FIG. 4. The process of the secure ACARS solution of the invention for preparing the data for transmission is executed in reverse order at the receiving end of the transmission to reconstruct the original user data. The steps executed by the receiver are: i) pack received data from each 8-bit character to 6-bit representation, and concatenate the 6-bit representations into a single bit stream; ii) if encryption was applied in preparing the data for transmission, decrypt/authenticate the bit stream; iii) apply appropriate standard de-compression algorithm; and iv) encode each 6-bit data to an 8-bit ACARS character.

Effectively, this encoding scheme of the invention assures that there will not be any growth in character-based user data, even if standard compression algorithms do not have an effective compression ratio. In most cases, the compressed, encrypted data will be smaller than the original due to the benefit of applying a standard compression algorithm to the packed bit stream. Therefore, the secure ACARS algorithm of the invention reduces the operating cost of the ACARS system and increases ACARS network capacity, while providing the additional benefit of encryption. Also, data compression further enhances the confidentiality of the user data.

The invention is the process of using an encoding/decoding scheme coupled with any standard compression algorithm to reduce the size of ACARS data, as described herein. The process improvement is applicable regardless of which compression algorithm is applied. The process of the invention can be used with or without data encryption. This invention specifically includes the known standard DEFLATE and V.42bis compression algorithms. The process of the invention can be implemented in software or hardware, such as using an ASIC (Application Specific Integrated Circuit). The best mode is implementing the secure ACARS algorithm of the invention in software as a computer program product, as described herein.

This invention presents the secure ACARS system and describes the architecture, protocol and the messages necessary to exchange information confidentially over the ACARS data link. In addition, this invention provides a compression algorithm to reduce the offered load on the ACARS network and a technique to encrypt the ACARS protocol header that will protect the identity of the aircraft without affecting interoperability with legacy ACRS equipment.

Certificate Authority components, digital signature and key agreement algorithms are based on existing aeronautical standards. The secure ACARS messaging protocol, header encryption techniques, and algorithms, techniques and the strategy of the invention use a compression scheme to reduce ACARS message sizes. The cryptographic algorithms and Certificate Authority component specified for secure ACARS solution of the invention are derived from the ATN Standards. Thus, a clear migration path to ATN is provided and customer investment in ACARS is protected.

This invention also defines a protocol to derive a set of secret keys that is used to authenticate, and encrypt subsequent transactions.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

In the Figures, like numerals indicate like elements.

The present invention is a secure apparatus and method for transmitting a stream of 6-bit user data on the Aircraft Addressing and Reporting System (ACARS). The secure ACARS invention includes means for compressing 6-bit data; and means for converting the compressed 6-bit data for transmission over an ACARS network by converting the compressed 6-bit data into a 8-bit ACARS characters. The secure ACARS invention also includes means for transmitting the data over an ACARS network; means for converting the data for transmission over an ACARS network into compressed 6-bit; and means for de-compressing 6-bit data. The 6-bit data is compressed by applying a known software compression algorithm to the 6-bit data, such as one of the known DEFLATE and v.42bis algorithms. The invention further includes means for packing each 8-bit character-oriented data into a 6-bit representation when the user data is 8-bit character-oriented data, and means for encrypting the compressed 6-bit data as desired.

Secure ACARS Architecture

Figure 1:
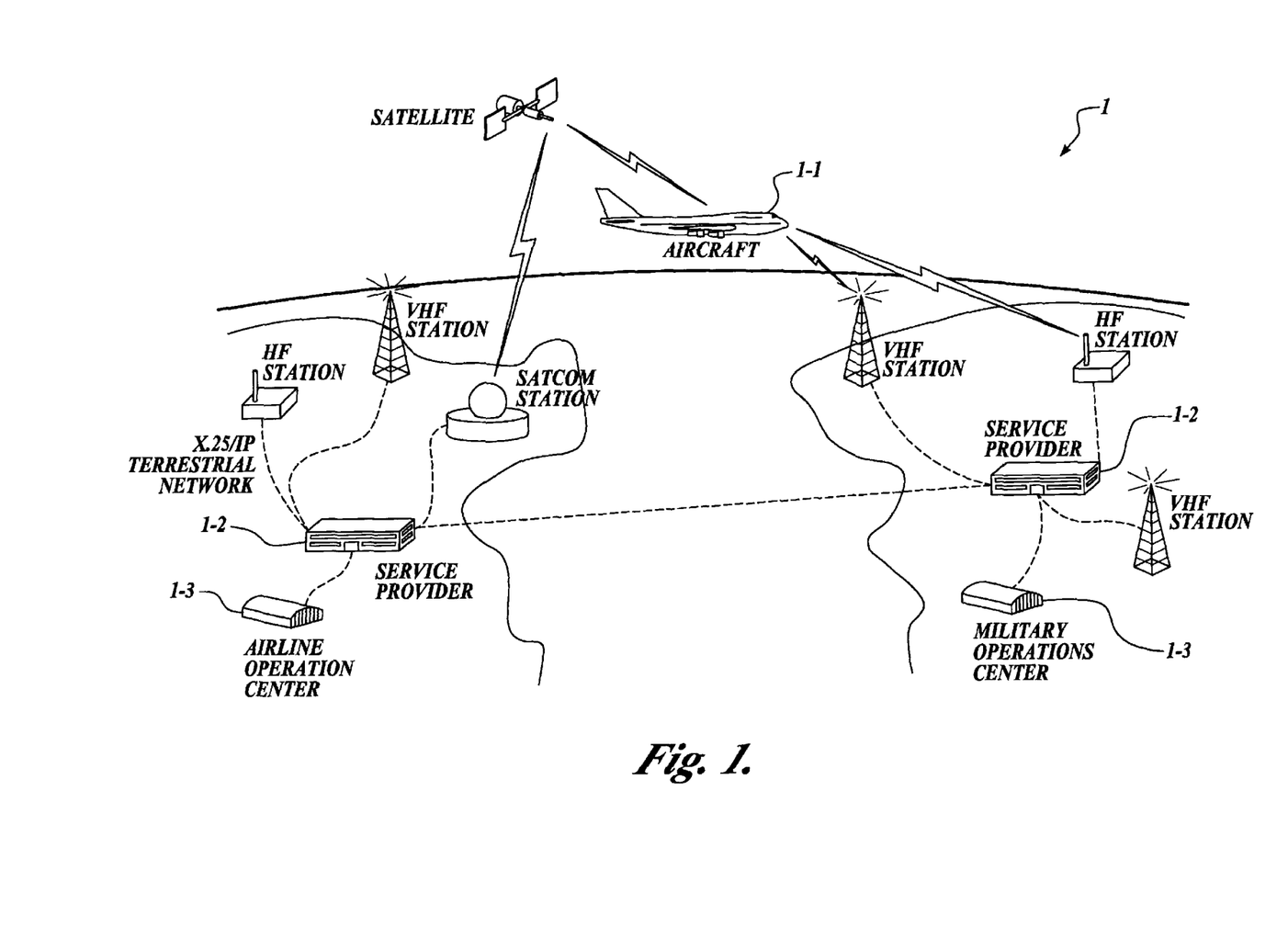
FIG. 1 is an illustration of one embodiment of the secure ACARS communications architecture of the invention.

FIG. 1 illustrates one embodiment of the secure ACARS communications architecture of the invention. ACARS is a character-oriented communications system that enables an aircraft's on-board avionics 1-1 to exchange information with peer ground host computers. As shown in FIG. 1, ACARS communications 1 can use multiple RF media, such as VHF, HF and/or satellite. These ACARS air/ground networks are maintained by data link service providers (DSP) 1-2. A standard terrestrial network interconnects different commercial airline and military operations centers 1-3 as well as different VHF, HF and satellite communications stations with the DSPs.

Figure 2:
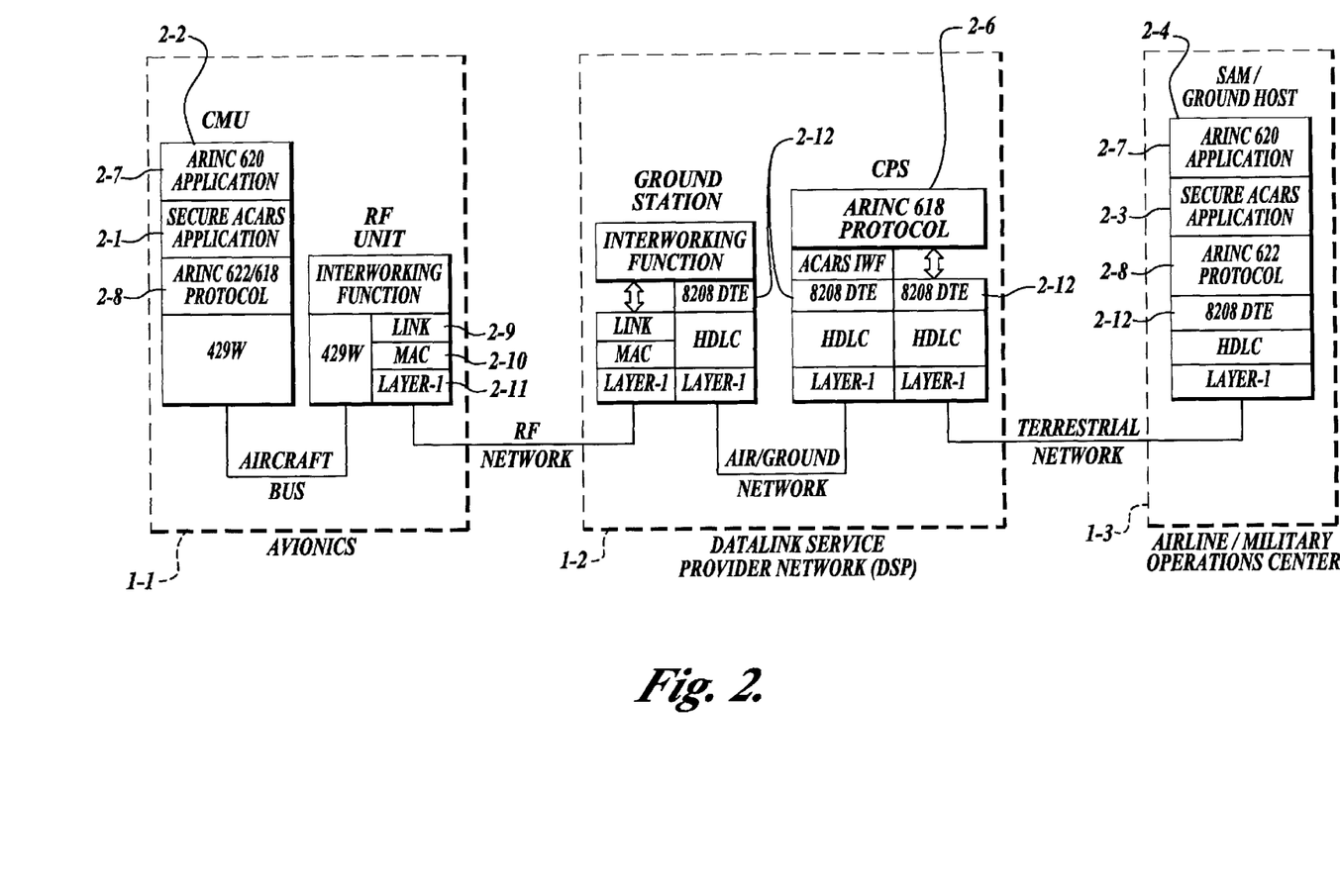
FIG. 2 illustrates one embodiment of the secure ACARS protocol architecture of the invention.

FIG. 2 illustrates one embodiment of the Secure ACARS Protocol Architecture 2 of the invention. Aeronautical Radio, Incorporated (ARINC) and Societe Internationale de Telecommunications Aeronautiques (SITA) are the two dominant service providers who carry the bulk of ACARS data through their private networks. All uplink and downlink messages are sent via a central processing system (CPS) 2-1 maintained by the DSP 1-2. The CPS performs message formatting, routing, and relaying functions using information contained in the ACARS message header. Ground hosts are typically located at the operations center 1-3 and interface with the CPS via private terrestrial networks.

As illustrated in FIG. 2, the secure ACARS system of the invention utilizes existing ACARS communications infrastructure and is structured to co-exist with other legacy ACARS equipment. In order to facilitate migration to ATN, the security solution of the invention is implemented as an application, thus making it independent of the underlying communications mechanism. However, the communication protocol is modified for encryption of header information to ensure interoperability with the DSP and to share network resources with other users.

The invention includes a secure ACARS manager (SAM) application 2-1 that provides all functionality required to establish and maintain a secure dialogue. SAM is hosted on the Communications Management Unit (CMU) 2-2 avionics, which controls air/ground cockpit data communications. The peer SAM application 2-3 on the terrestrial side is implemented on a dedicated Front End Processor (FEP) 2-4 at the customer premises, i.e., the military or airline operations center 1-3. This strategy isolates existing ACARS hosts from any changes caused by the security solution of the invention while protecting the information end-to-end. Alternatively, SAM 2-1 is implemented on the ACARS ground host as an integrated application.

Secure ACARS Messaging Protocol

ACARS protocols are defined by the Airline Electronic Engineering Committee (AEEC) and are maintained by ARINC. The secure ACARS solution of the invention utilizes these specifications, without modification, to transfer user data confidentially over the ACARS communications network.

The secure ACARS solution of the invention is implemented as an application layer protocol whereby a set of messages is exchanged between peer SAM application processes residing on the avionics CMU 2-2 and the ground FEP 2-4. The protocol architecture, key establishment and message transfer scenarios provided by the secure ACARS solution of the invention follow.

Protocol Architecture

ARINC Specification 620 defines the application messages that are supported by ACARS. See, ARINC, *DATA LINK GROUND SYSTEM STANDARD AND INTERFACE SPECIFICATION (DGSS/IS)*, Characteristic 620-4, Annapolis, AEEC, (1999), which is incorporated herein by reference. Depending on the type of ACARS application, the sender formats the data according to ARINC 620 and forwards it to the communications process. If the data originates at the ground host, it is sent to the CPS 2-6 via a standard terrestrial network. The CPS 2-6 repackages the data for transmission over the air/ground network using a set of rules specified in ARINC 620. ARINC 618 specifies the protocol used between the CMU and the CPS. See, ARINC, *AIR/GROUND CHARACTER-ORIENTED PROTOCOL SPECIFICATION*, Specification 618-4, Annapolis, AEEC, (1999), which is incorporated herein by reference. If the user data is bit-oriented, the sender encodes the data using the bit-to-hex conversion algorithm specified in ARINC 622 before transmission over character oriented ACARS network. See, ARINC, *ATS DATA LINK APPLICATIONS OVER ACARS AIR/GROUND NETWORK*, Specification 622, Annapolis, AEEC, (1998), which is incorporated herein by reference. A field, called "message label" contained in the ACARS protocol header, signals the application type to the receiver. The receiver first terminates the ARINC 618 protocol, and inspects the "message label" field. If the label indicates that ARINC 622 encoding was performed, it decodes the data first, then forwards it to the appropriate ARINC 620 application process. Therefore, an end-to-end peer relationship exists between the avionics CMU 2-2 and the ground host FEP 2-4 for ARINC 620 and ARINC 622.

The standard ACARS architecture is modified to protect user data end-to-end using secure ACARS protocol. As shown in FIG. 2, the SAM application process 2-1 resides in between the ARINC 620 process 2-7 and the ARINC 622 process 2-8 within the CMU 2-2 and the ground host 2-4.

The protocol architecture diagram of FIG. 2 implies that SAM 2-1 is embedded within the ground host 2-4. However, SAM 2-1 is located on a stand-alone FEP that terminates ARINC 622 protocol as well. How data is exchanged between the SAM and the ground host is an implementation issue and depends on the architecture of the particular ground facility 1-3. The underlying ACARS 618 protocol between CMU 2-2 and the CPS 2-6 is unaffected. FIG. 2 shows only a generic representation of the air/ground protocols used within the ACARS subnetwork. The link 2-9, media access control (MAC) 2-10 and physical layer 2-11 protocols depend on the specific RF media used. Similarly, ISO 8208 is shown as the terrestrial protocol 2-12 between the CPS and the ground host, although any other standard protocols may be used. As the secure ACARS messaging protocol of the invention is implemented at the application layer, it is independent of the RF media and the intermediate communication protocols.

The secure ACARS protocol of the invention is connectionless, but it is necessary to establish a session between the peer SAM applications before any user data transfer can be secured. Initial dialogue exchanges session specific parameters that are used to derive the secret session key(s). A session typically corresponds to a flight or a mission. Reestablishment of secret key(s) for every session, using different session parameters prevents replay attacks and reduces the lifetime of the secret key(s). Shorter lifetime of keys reduces the probability of security failure due to brute-force attacks.

The secure ACARS messaging protocol of the invention does not support error recovery. It relies on ARINC 618 protocol to recover from protocol errors introduced during transmission through the ACARS network. In addition, the ARINC 622 protocol provides end-to-end data integrity using a 16-bit checksum. If an error is detected by that checksum, the message is dropped causing retransmission of the message by the corresponding application. If the cryptographic integrity fails, SAM aborts the secure session and discards the secret session key(s). Subsequent secure exchanges will require re-initialization of the secure dialogue, thereby providing additional security.

The secure ACARS messaging protocol of the invention defines six new ACARS messages. These messages are, for example, standardized in the ARINC 620 specification, or they are alternatively implemented using "user defined message labels" available in ARINC 620 for customization on non-standard ACARS applications. Descriptions of these six new core ACARS messages follow:

An Initialization_request that is sent by the aircraft SAM to initiate a secure communications session with its peer ground SAM. The Initialization_request message contains the identity of the aircraft (U), the identity of the ground SAM (V), and the current time (T). The aircraft SAM appends its digital signature ($s_U$) to the message to assure its cryptographic integrity. Inclusion of the identities binds the secure session to the initiating and responding entities, while the time field is included to ensure freshness of the message.

An Initiation_response that is sent by the ground SAM to complete the secure communications session establishment. The Initiation_response contains the identities of both the airborne and the ground SAMs, and a random number (R) generated by the ground SAM. The random number R is used to derive the shared secret key that is used to protect all subsequent data transfer. A Message Authentication Code (MAC) is appended to the message to ensure the cryptographic integrity of the response.

A Data_transfer message that is send asynchronously by either the ground or the airborne SAM. The Data_transfer message contains the identities of both the sender and the receiver as well as the ACARS payload data. All Data_transfer messages are encrypted using the shared secret key derived during initialization.

An Abort message that is sent by a SAM entity if it detects a cryptographic failure with the previous exchange. The Abort message contains the identities of both the sending and the receiving SAM and is digitally signed to ensure authenticity. The identities are included to eliminate the possibility of an attacker to arbitrarily send the abort message, thereby disrupting communications. An abort message can be sent by either SAM entity after an Initialization_request has been transmitted. The receiving and the sending SAM entities log this event as a security failure and notify the user applications. The application users may revert back to voice communications until the security failure is resolved satisfactorily.

A Session_release_request that is sent by a SAM entity if it wants to gracefully terminate the session. The Session_release_request contains a MAC and the identities of both the sending and receiving SAM entities. A Session_release_request message can be sent in response to an Initialization_request.

A Session_release response that is sent in response to a Session_release_request to complete session termination. The Session_release_response contains a MAC and the identities of both the sending and receiving SAM entities.

Secure ACARS Operation

The secure ACARS solution of the invention includes a hybrid security scheme that employs both symmetric and asymmetric cryptography to transfer ACARS application data confidentially. In a symmetric or secret key scheme, both the sender and the recipient use the same key to encrypt and decrypt the data. As such, symmetric scheme requires that every pair of communicating parties to have a unique secret key that is protected from unauthorized access. This may be difficult to achieve for a large number of users.

In an asymmetric, or public-key, scheme, each party has an asymmetric pair of keys: a private key that is kept secret, and a public key that can be published. The sender uses its own private key to digitally sign a message, and uses the public key of the receiver to encrypt it. The receiver uses the public key of the sender to verify the digital signature, but uses its own private key to decrypt the message. The unique characteristic of the asymmetric key pair ensures that it is extremely difficult to derive the private key from the public key. Therefore, if the private key is protected, it guarantees the authenticity of the signature and confidentiality of the message. The asymmetric scheme overcomes the key distribution problem of the symmetric scheme, but it requires a larger key size to provide the same level of security. Therefore, asymmetric cryptography consumes more RF bandwidth and requires more computational power.

ATN Security SARPs specified a hybrid scheme for aeronautical communications to take advantage of the benefits of both asymmetric and symmetric schemes. See, McParland, *CNS/ATM PACKAGE-II STANDARDS AND RECOMMENDED PRACTICES (SARPS), SUB-VOLUME VIII—ATN SECURITY SERVICES*, (2001), which is incorporated herein by reference. ATN uses the asymmetric scheme to exchange identities and key derivation parameters during session establishment. Once a session key is derived, a symmetric scheme is used to protect all subsequent exchanges. ATN also utilizes the emerging elliptic curve algorithms to further optimize the key establishment procedure. See, *ELLIPTIC CURVE CRYPTOGRAPHY*, SEC 1, Draft, Standards for Efficient Cryptography Group, (1999), http://www.secg.org, which is incorporated herein by reference.

Secure ACARS uses the same algorithms for signing, authentication, key derivation, MAC generation and verification as ATN to benefit from existing aeronautical standards and to ease migration to ATN. ATN does not specify any encryption/decryption algorithms at present. Two primary standards are presently being considered as an industry standard suitable for bandwidth limited, aeronautical communications. These two primary standards are the Triple Data Encryption Standard put forth by the National Institute of Standards and Technology in *DATA ENCRYPTION STANDARD*, Federal Information Processing Standard PUB 46-3, Gaithersburg (1999), and the Advanced Encryption Standard also put forth by the National Institute of Standards and Technology in *ADVANCED ENCRYPTION STANDARD*, Draft Federal Information Processing Standard, Gaithersburg (2001), both of which are incorporated herein by reference. The operational procedures described in herein are valid regardless of the specific standard selected for data confidentiality.

Secure ACARS Signature Scheme

The ASTG design of the Secure ACARS uses the Elliptic Curve Digital Signature Algorithm (ECDSA) which is designed to prevent forgery in order to provide the desired services of data integrity, data origin authentication, and non-repudiation. See, *PUBLIC KEY CRYPTOGRAPHY FOR THE FINANCIAL SERVICES INDUSTRY —THE ELLIPTIC CURVE DIGITAL SIGNATURE ALGORITHM (ECDSA)*, ANSI X9.62, American National Standards Institute (1998). According to ECDSA signature and verification operations, to generate a key pair, an entity first selects an elliptic curve E and a point G on E. The entity then selects a private key d, which is an integer picked at random, and computes the public key dG. To sign a message M, the SAM processes M with a known hash function called SHA-1, thereby obtaining a digital fingerprint SHA-1(M) of the message. Then the entity selects an integer k at random, and computes kG. The signature on M consists of r and s where:

$r = x(kG)$ and $s = k^{-1}(SHA\text{-}1(M) + dr) \pmod{n}$.

Here $x(kG)$ denotes the x coordinate of kG, and n denotes the smallest integer such that $nG = 0$.

When the receiving SAM process wants to verify the signature (r,s) on the message M it retrieves the public key $Q = dG$ of the sending SAM process and then checks the signature by computing:

$u_1 = SHA\text{-}1(M) \cdot s^{-1} \pmod{n}$ and $u_2 = r \cdot s^{-1} \pmod{n}$;

and comparing $x(u_1 G + u_2 Q)$ with r. The signature is genuine if the two values are equal.

Secure ACARS Key Agreement Scheme

The secure ACARS system of the invention uses a known key agreement scheme called the elliptic curve Diffie-Hellman. See, e.g., *CRYPTOGRAPHIC TECHNIQUES BASED ON ELLIPTIC CURVES—PART 3: KEY ESTABLISHMENT, ISO/IEC* 15946-3, Draft, International Organization for Standardization (1999), which is incorporated herein by reference.

The elliptic curve Diffie-Hellman key agreement scheme operates as follows: when two entities (U and V) want to establish a shared secret key, they exchange their public keys $d_U G$ and $d_V G$, where $d_U$ and $d_V$ are the private keys of the corresponding entities U and V. Then both entities compute a shared secret $Z_{U,V} = x(d_U d_V G)$. Entity U computes $d_U d_V G$ as $d_U(d_V G)$, and entity V computes $d_U d_V G$ as $d_V(d_U G)$, i.e. the product of its own private key and the peer entity's public key. Commutative properties of the elliptic curve ensures that $d_U(dg)$ and $d_V(d_U G)$ yield the same result.

The shared secret key is given by:

$K = SHA\text{-}1(Z \| D)$;

where $\|$ denotes concatenation, and D is additional data known to both entities such as their identities, as well as random values designed to ensure that a different shared secret key is computed each time the key agreement scheme is used.

The elliptic curve Diffie-Hellman scheme is designed to prevent an eavesdropper who witnesses the public key exchange from recovering the shared secret key. The known hash function SHA-1 is applied to Z to get K partly in order to break up any predictable structure that might exist in Z and partly to bind D into the shared key.

Pre-Conditions

In order to implement Secure ACARS the commercial and military operating agencies designate an entity, such as the Certificate Authority (CA), which is a trusted entity that issues the asymmetric cryptographic keys, the public key certificates, and the Certificate Revocation Lists (CRL). In addition, each operating agency chooses a set of elliptic curve domain parameters that satisfies its needs. The domain parameters and the key size determine the cryptographic strength. As agencies do not exchange ACARS messages across organizational boundaries, different organizations may choose different domain parameters without affecting interoperability. If the ACARS message header is encrypted, then a common set of elliptic curve domain parameters is defined such that ACARS DSP can decrypt the message header from all users and route it to the appropriate destination.

The elliptic curve domain parameters and the private key of the airborne SAM are pre-loaded in the aircraft using procedures specific to the operating agency. The airlines may for example update the private key every few months based on a schedule that coincides with their navigational database update, whereas the military may change the private key before each mission to enhance system security.

Key Establishment

Figure 3:
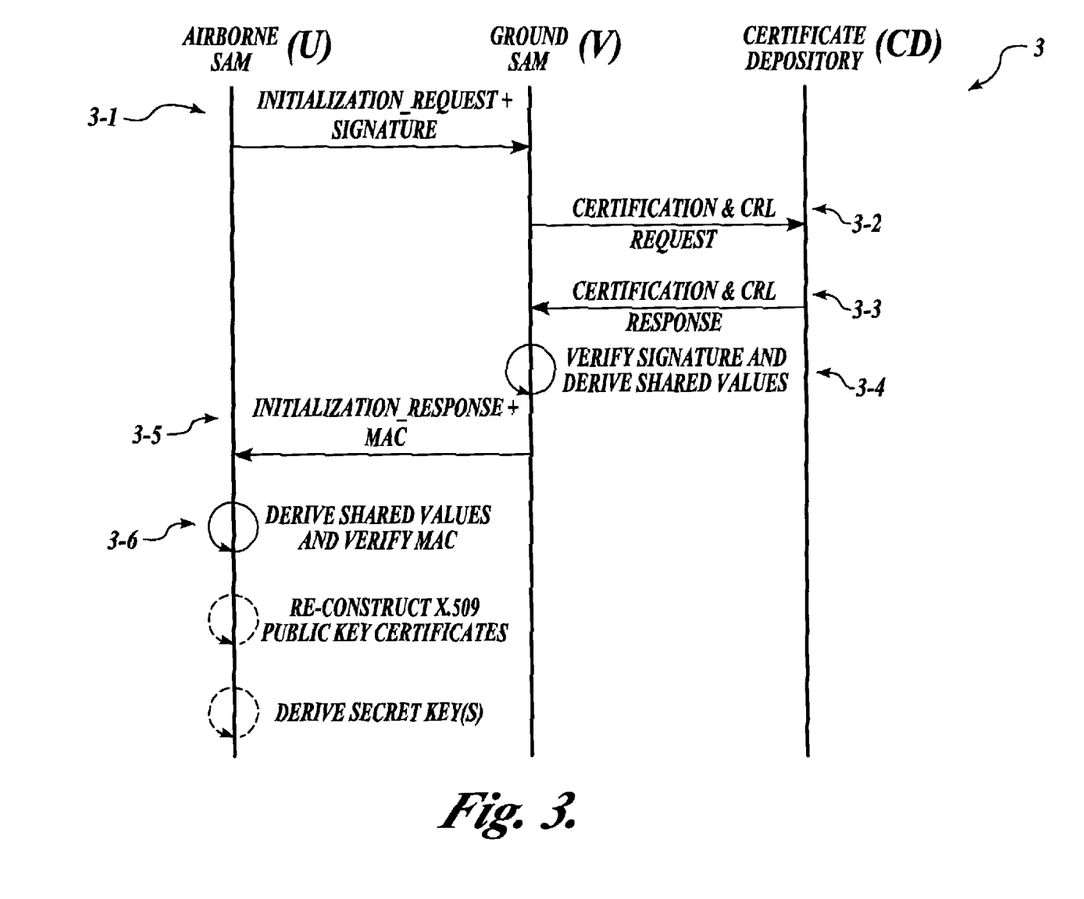
FIG. 3 is a chart that illustrates the secure ACARS Initialization and Key Establishment Message Sequence of the invention.

FIG. 3 illustrates the Secure ACARS Initialization and Key Establishment Message Sequence of the invention in a chart 3. To establish a secret session key, the airborne SAM (U) creates an Initialization_request message 3-1. The airborne SAM (U) signs this message and sends this message with the signature (su) to the ground SAM (V) as shown in FIG. 3.

The Initialization request message 3-1 contains the identities of airborne SAM (U) and ground SAM (V) and the current time on board the aircraft, given by:

Data = $(U \| V \| Time_U)$, and $s_U = Sign (d_{sig,U}; Data)$.

On receipt of this request message (3-2), the ground SAM (V) obtains (3-3) the certificate of the aircraft and the latest CRL from a certificate depository (CD), which may be either a local database or a directory service.

The ground SAM (V) checks the identities U and V and the time for accuracy (3-4). It then verifies the signature at, $s_U$ using ECDSA algorithm.

Next, the ground SAM (V) selects a random challenge, R and computes two shared session keys using its private key and airborne SAM's (U) public key according to:

MacKey$_{U,V}$=SHA-1(Z$_{U,V}$||00$_{16}$||s$_U$||R); and

EncryptionKey$_{U,V}$=SHA-1(Z$_{U,V}$||01$_{16}$||MacKey$_{U,V}$||U||V).

The 16-bit integer values '00' and '01' are used to ensure that the SHA-1 operation will always yield different values for the MacKey and the EncryptionKey. The MacKey is used to provide cryptographic integrity for any unencrypted message exchange, whereas the EncryptionKey is used to encrypt or decrypt ACARS application data.

The ground SAM (V) stores both keys securely. Then the ground SAM (V) forms the Initialization_response and a message authentication code (MAC) as following:

Data=(V||U||R||Count$_{V,U}$||D$_V$G), and

MAC=SHA-1(MacKey$_{U,V}$; V||U||Count$_{V,U}$||Data||s$_U$);

where: R is a random number generated by V; d$_V$G is the public key of the ground SAM (V); and Count$_{V,U}$ is a sequence number that is used to prevent replay.

Ground SAM then sends the data and the MAC as Initialization_response to the airborne SAM (3-5).

On receipt of the Initialization_response, the airborne SAM (U) derives the EncryptionKey and the MacKey in similar fashion (3-6). The airborne SAM (U) then verifies the response by computing the MAC independently and comparing it with the MAC contained in the response. If the message is authenticated, it stores the keys securely for future use. Otherwise, it sends an abort message to the ground SAM (V) and restarts the initialization process.

Application Data Transfer

Once the secret encryption key has been derived by the peer SAM processes, either entity can send a Data_transfer message by encrypting the message using a suitable encryption algorithm.

ACARS Bandwidth Preservation

FIG. 4 shows the effect of the ARINC 622 encoding algorithm on ACARS data flow. The cryptographic signature, MAC and the encryption operations specified for the secure ACARS of the invention all generate bit-oriented data (4-1). The existing ACARS communication protocol is character-oriented. As such, it requires the bit-oriented data to be converted to ASCII characters before it can be transmitted over ACARS network. A bit-to-hex encoding algorithm is specified in ARINC 622 for this purpose (4-2). This algorithm is extremely inefficient in terms of bandwidth conservation. As shown in FIG. 4, it doubles the size of bit-oriented application data in the conversion process. The double-size application data is transmitted over ACARS communications network (4-3). As described above, the received data is decoded (4-4) and returned to the original user data (4-5).

Only a limited number of frequencies are available for ACARS communications. In addition, these frequencies are already saturated to support the existing ACARS application data. Therefore, the proposed ATN security algorithms will not be acceptable for the user community as the standard ACARS encoding will double the offered load on the ACARS network.

Figure 5:
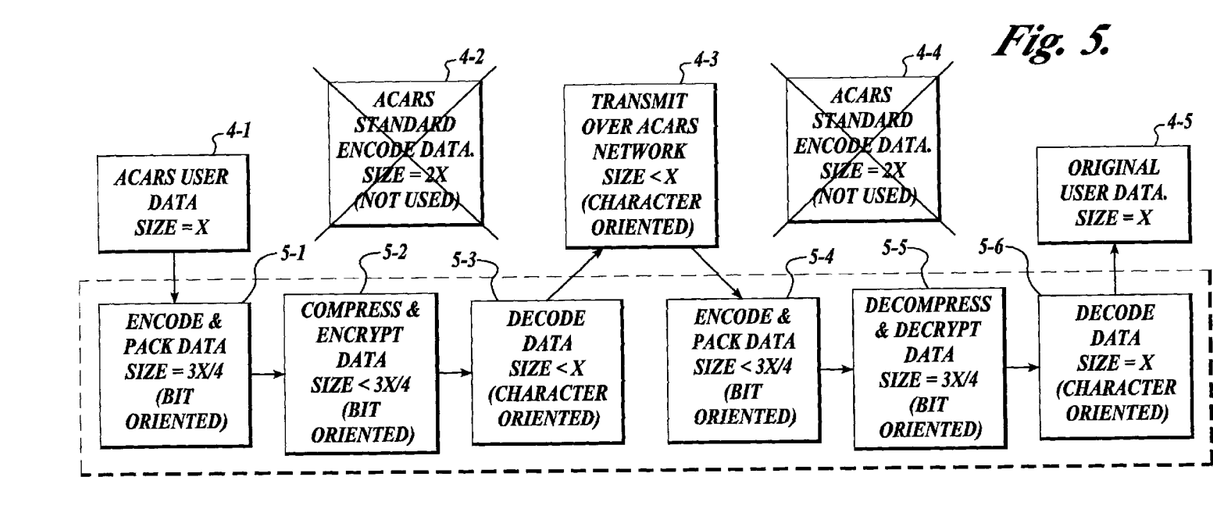
FIG. 5 is a chart that graphically illustrates the encoding and compression technique of the invention in conjunction with encryption of ACARS data according to the invention.

FIG. 5 graphically illustrates the encoding and compression technique of the invention in conjunction with encryption of ACARS data according to the invention. The ACARS application data (4-1) is pre-formatted containing a lot of free spaces and redundant keywords. As such, a standard data compression algorithm effectively reduces the size of the ACARS application message. For example, the ATN SARPs, described and incorporated above, specifies a compression algorithm called DEFLATE that has been proven to compress air traffic control application data by a factor of two or three to five. See, Deutsch, P., *DEFLATE COMPRESSED DATA FORMAT SPECIFICATION VERSION 1.3*, Internet RFC 1951, IETF (1996). Studies conducted during ATN specification development proved that the DEFLATE algorithm can compress an arbitrary stream of data, and reduce its size by a factor of two to five. Therefore, use of the DEFLATE algorithm on ACARS user data will, in the worst case, yield the same size payload, after encryption, as the original. The DEFLATE compression algorithm and the well-known ITU-T standard V.42bis compression algorithm are recommended for practicing the secure ACARS invention.

The secure ACARS of the invention compresses ACARS application messages before encryption. In addition to the standard compression algorithm, a unique proprietary encoding/decoding algorithm has been developed that also compresses ACARS characters, and converts an arbitrary bit stream into ACARS characters. The secure ACARS of the invention replaces the standard ACARS bit-to-character encoding scheme with the proprietary algorithm. Contrary to the ACARS encoding scheme, the new proprietary encoding/decoding algorithm does not increase the size of ACARS messages. An ACARS message is first converted to bits and compressed to a bit stream. Then this bit stream is encrypted. The encrypted message is encoded using the new proprietary encoding algorithm before transmission over ACARS network. This scheme results in thirty to fifty percent reduction in offered load on ACARS frequencies. Therefore, the invention solution conserves ACARS bandwidth, while maintaining the confidentiality of user data. The DEFLATE algorithm can be applied to ACARS regardless of encryption to conserve the scarce RF resources. The benefits of using the encoding and compression technique of the invention in conjunction with encryption of ACARS data is pictorially represented in FIG. 5.

In addition to the standard compression techniques, the above proprietary encoding and decoding scheme as part of the compression scheme of the invention. This new proprietary encoding/decoding scheme replaces the standard ACARS bit-to-character encoding scheme because the standard ACARS encoding doubles the size of bit-oriented user data, while there is no growth in character-based user data using the proprietary encoding/decoding scheme of the invention.

The compression scheme of the invention includes:

(5-1) If user data is character-based, the user data is encoded into a bit stream that packs each 8-bit character data into a 6-bit representation, the 6-bit characters being concatenated together into a single bit stream. This compresses user data by 25% (twenty-five percent). If the user data is originally bit-oriented, encoding the data is unnecessary.

(5-2) A compression algorithm is applied to the resulting bit stream. Any standard compression technique may be used. The known standard DEFLATE or v.42bis algorithms referenced above yield relatively good results when the user data size is small. Application of one of these or another standard compression techniques can reduce the bit stream by as much as 25 to 33 percent, depending on the size of the data. The standard compression techniques are more effective on larger bit streams.

The resulting compressed bit stream is optionally encrypted/authenticated according to user preference. The encryption/authentication adds nothing to the size of the compressed bit stream.

(5-3) The resulting bit stream is then encoded by converting each 6-bit user data into a 8-bit ACARS character. This encoding scheme ensures that the output characters are of a type that is approved for transmission over the ACARS network. This encoding scheme expands the bit stream by ⅓ or 33⅓% (thirty-three and one-third percent). However, the size of bit-oriented user data is no larger than the original character-oriented user data, and may be smaller depending on the effectiveness of the compression algorithm applied to the bit stream at 5-2. The standard ACARS bit-to-character encoding scheme 4-2, shown in FIG. 4 that doubles the size of bit-oriented user data, is thus eliminated by the secure ACARS solution of the invention. The corresponding standard ACARS decoding scheme 4-4 is thus also eliminated by the invention.

The resulting character-stream is sent to the peer entity via the ACARS network 4-3, as shown in FIG. 4.

The above process of the secure ACARS solution of the invention is executed in reverse order at the receiving end of the transmission to reconstruct the original user data. The reconstruction executed by the receiver includes:

(5-4) packing received data from each 8-bit character to 6-bit character, which results in a bit stream of 6-bit characters concatenated together;

(5-5) if encryption was applied to the transmitted data, decrypting/authenticating the bit stream, and applying an appropriate standard de-compression algorithm; and (5-6) encoding each 6-bit character to an 8-bit ACARS character.

Effectively, this encoding scheme of the invention assures that there will not be any growth in character-based user data, even if standard compression algorithms do not have an effective compression ratio because of the size of the data. In most cases, the compressed, encrypted data will be smaller than the original due to the benefit of applying standard compression algorithm to the packed bit stream. Therefore, the secure ACARS algorithm of the invention reduces the operating cost of the ACARS system and increases ACARS network capacity, while providing the additional benefit of encryption. Also, data compression further enhances the confidentiality of the user data.

Protection of Aircraft Identity

Figure 6:
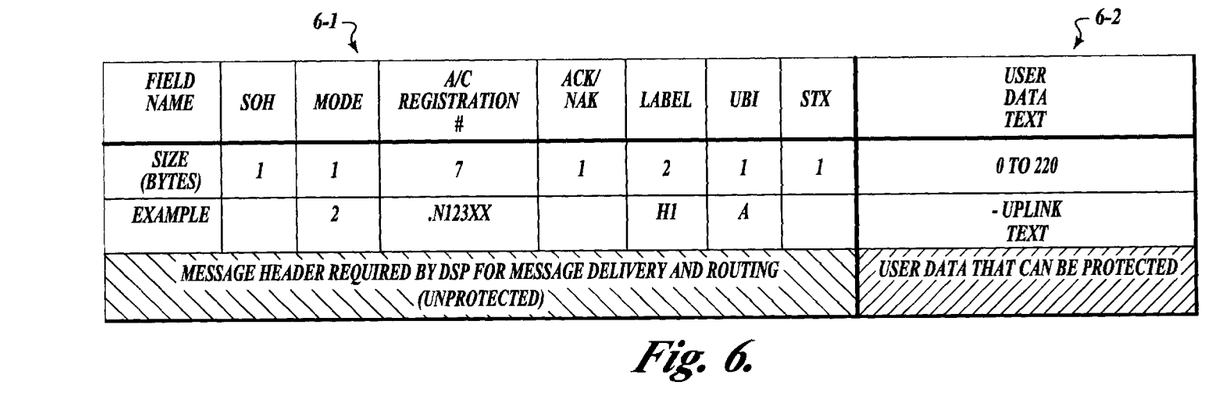
FIG. 6 illustrates the secure ACARS Uplink Message Format of the invention.
Figure 7:
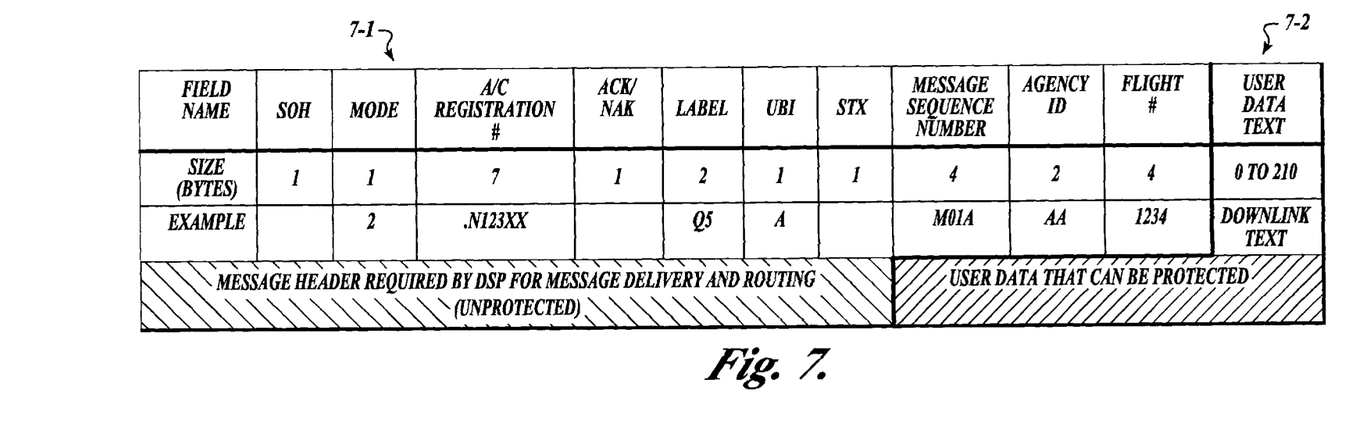
FIG. 7 illustrates the secure ACARS Downlink Message Format of the invention.

FIG. 6 illustrates the secure ACARS Uplink Message Format of the invention, and FIG. 7 illustrates the secure ACARS Downlink Message Format of the invention. The protocol data unit (PDU) transferred over the ACARS network consists of two main components: a protocol header (6-1,7-1); and the payload that carries the user data (6-2,7-2). The protocol header (6-1,7-1) contains the aircraft address and message label that are used by the CPS to route ACARS messages to the appropriate destination. FIGS. 6 and 7 show the ACARS uplink and downlink PDU formats respectively. The CPS obtains the downlink delivery address by static table lookup using the agency ID and the label contained in the downlink.

Inspection of the header (6-1,7-1) permits an attacker to monitor the progress of a flight and to get some indication of the type of information it is exchanging even if the payload is encrypted. The commercial air transport operators are not concerned with this disclosure, as they have to file flight plans that can be obtained easily from public records. However, private aircraft operators and the military consider the aircraft address, i.e., the flight number and the registration number, the agency ID, and the message label as sensitive information. Disclosure of that data to an adversary may jeopardize their mission.

It is possible to encrypt the ACARS PDU header (6-1,7-1) using similar procedures discussed above for the confidentiality of user data. Satisfaction of the following criteria ensures interoperability and sharing of common network resources with ACARS users that do not use security functions. The elliptic curve domain parameters, the key size, and the algorithms used for PDU header encryption should be standardized in an AEEC document. The keys used to secure the PDU header should be different from the keys used to encrypt the user data. A set of application messages, similar to the SAM protocol messages specified above, should be specified in the ARINC 620. These messages are to be exchanged between the airborne SAM and the secure application process supported by the DSP. A mechanism should be defined in AEEC specifications such that secure and non-secure entities can communicate on the same ACARS broadcast frequency without interfering with each other.

Interoperability and resource sharing can be accomplished by reserving a "Mode" character for secure communications. As shown in FIGS. 6 and 7, the "Mode" character occurs first in the ACARS PDU header (6-1,7-1). ACARS components inspect this character to determine the type of ACARS protocol supported by its peer entity. Preliminary analysis indicates that a spare "Mode" character can be reserved for operation of the secure ACARS process of the invention.

All ACARS transmissions are delimited by special control characters that signal the beginning and the end of a transmission. The +,*,SYN, and SYN characters are sent in sequence at the beginning of a transmission. These characters permit a receiver to detect and synchronize with an ACARS transmission such that it can successfully interpret the signal. Similarly, the DLE character is transmitted at the end, which helps the receiver to end its reception of that transmission. If an ACARS receiver detects energy on the RF that is correctly modulated as per ACARS specifications, that receiver will consider the channel occupied and will abstain from transmission even if it can not correctly decode the complete signal. Therefore, by starting secure ACARS transmission with +,*,SYN, SYN characters; terminating it with the DLE; and using a special "Mode" character, the secure ACARS process of the invention will co-exist on the same frequency with legacy ACARS equipment.

Computer Product

In addition to being practiced as apparatus and methods, the present invention is also practiced as a computer program product for securely conveying data between an aircraft and the ground based on Aircraft Addressing and Reporting System (ACARS) technology, the computer program product including a computer-usable medium having computer-readable code embodied therein for configuring a computer processor, the computer program product being: computer-readable code configured to cause a computer processor to receive a bit stream of 8-bit character-oriented ACARS user data; computer-readable code configured to cause a computer processor to encode each 8-bit character in the bit stream of 8-bit character-oriented user data into data having a 6-bit representation, resulting in a bit stream having 6-bit orientation; computer-readable code configured to cause a computer processor to compress the resulting bit stream of 6-bit data; and computer-readable code configured to cause a computer processor to convert each 6-bit character in the resulting bit stream into a 8-bit ACARS character, thereby generating a bit stream of 8-bit ACARS characters.

The computer program product further includes: computer-readable code configured to cause a computer processor to process the generated bit stream of 8-bit ACARS characters by converting each 8-bit ACARS character into a 6-bit character, thereby generating a bit stream of 6-bit characters concatenated together; computer-readable code configured to cause a computer processor to de-compress the resulting bit stream of 6-bit data; and computer-readable code configured to cause a computer processor to encode each character having a 6-bit representation into a 8-bit character, resulting in a bit stream of 8-bit character-oriented user data.

The computer-readable code configured to cause a computer processor to compress the resulting bit stream of 6-bit data is preferably a known standard compression algorithm, such as one of the known DEFLATE and v.42bis algorithms.

The computer program product optionally includes computer-readable code configured to cause a computer processor to encrypted/authenticate the bit stream of compressed 6-bit data; and computer-readable code configured to cause a computer processor to decrypt/authenticate the de-compressed bit stream of 6-bit data.

While the preferred embodiment of the invention has been illustrated and described, it will be appreciated that various changes can be made therein without departing from the spirit and scope of the invention.

What is claimed is:

1. A secure Aircraft Addressing and Reporting System (ACARS) apparatus, comprising:
    means for compressing 6-bit data; and
    means for converting the compressed 6-bit data for transmission over an ACARS network.

2. The secure ACARS of claim 1 wherein the means for converting the compressed 6-bit data for transmission over an ACARS network further comprises means for converting the compressed 6-bit data into a 8-bit ACARS characters.

3. The secure ACARS of claim 1 wherein the means for compressing 6-bit data further comprises means for applying a compression algorithm to the 6-bit data.

4. The secure ACARS of claim 3 wherein the means for compressing the 6-bit data further comprises means for applying a software algorithm to the 6-bit data.

5. The secure ACARS of claim 4 wherein the compression algorithm is one of a DEFLATE algorithm and a v.42bis algorithm.

6. The secure ACARS of claim 1 wherein the user data comprises 8-bit character-oriented data, and
    further comprising means for packing each 8-bit character-oriented data into a 6-bit representation.

7. The secure ACARS of claim 1, further comprising means for encrypting the compressed 6-bit data.

8. The secure ACARS of claim 1, further comprising:
    means for transmitting the data over an ACARS network;
    means for converting the data for transmission over an ACARS network into compressed 6-bit; and
    means for de-compressing 6-bit data.

9. A method for using an electronic circuit to securely convey data between an aircraft and the ground based on Aircraft Addressing and Reporting System (ACARS) technology, the method comprising:
    a) processing the data as a stream of 6-bit data;
    b) with the electronic circuit, compressing the stream of 6-bit data; and
    c) with the electronic circuit, converting each 6-bit data into a 8-bit ACARS character.

10. The method recited in claim 9 wherein compressing the stream of 6-bit data further comprises applying a standard compression algorithm to the stream of 6-bit data.

11. The method recited in claim 10 wherein applying a standard compression algorithm to the stream of 6-bit data further comprises applying one of the DEFLATE algorithm and the v.42bis algorithm.

12. The method recited in claim 9, further comprising encrypting the compressed stream of 6-bit data.

13. The method recited in claim 9 wherein the data to be securely conveyed comprises character-oriented data, and
    further comprising encoding the character-oriented data into a character-oriented bit stream having each 8-bit character data packed into a 6-bit representation.

14. The method recited in claim 9, wherein converting each 6-bit data into a 8-bit ACARS character generates a stream of 8-bit ACARS characters, and
    further comprising transmitting the stream of 8-bit ACARS characters via the ACARS network.

15. The method recited in claim 14, further comprising:
    receiving the stream of 8-bit ACARS characters;
    with the electronic circuit, packing received data from each 8-bit character to 6-bit character, thereby generating a compressed stream of 6-bit data;
    with the electronic circuit, de-compressing the stream of 6-bit data; and
    with the electronic circuit, encoding each 6-bit data to an 8-bit ACARS character.

16. A computer program residing on a computer usable storage medium for transmitting data on the Aircraft Addressing and Reporting System (ACARS), the computer program comprising:
    computer-readable program code means for receiving one or more signals representative of user bit-oriented data as a stream of 6-bit characters;
    computer-readable program code means for compressing the stream of 6-bit characters; and
    computer-readable program code means for converting each 6-bit character of the stream of 6-bit characters into a 8-bit ACARS character.

17. The computer program of claim 16 wherein the computer-readable program code means for compressing the stream of 6-bit characters further comprises computer-readable program code means for applying a standard compression algorithm to the stream of 6-bit characters.

18. The computer program of claim 17 wherein the computer-readable program code means for applying a standard compression algorithm to the stream of 6-bit characters further comprises applying one of the DEFLATE algorithm and the v.42bis algorithm.

19. The computer program of claim 16, further comprising computer-readable program code means for encrypting the compressed stream of 6-bit characters.

20. The computer program of claim 16 wherein the data to be transmitted comprises character-oriented data, and
    further comprising computer-readable program code means for encoding the character-oriented data into a character-oriented bit stream having each 8-bit character data packed into a 6-bit representation.

21. The computer program of claim 16 wherein the computer-readable program code means for converting each 6-bit character into a 8-bit ACARS character further generates a stream of 8-bit ACARS characters, and
    further comprising computer-readable program code means for causing the stream of 8-bit ACARS characters to be transmitted via the ACARS network.

22. The computer program of claim 21, further comprising:
    computer-readable program code means for means for receiving the stream of 8-bit ACARS characters;
    computer-readable program code means for packing received data from each 8-bit character to a 6-bit character, thereby generating a compressed stream of 6-bit characters;

computer-readable program code means for de-compressing the stream of 6-bit characters; and computer-readable program code means for encoding each 6-bit character to an 8-bit ACARS character.

23. A computer program product, comprising:

a computer-usable medium having computer-readable code embodied therein for configuring a computer processor, the computer program product comprising:

computer-readable code configured to cause a computer processor to receive a bit stream of 8-bit character-oriented ACARS user data;

computer-readable code configured to cause a computer processor to encode each 8-bit character in the bit stream of 8-bit character-oriented user data into data having a 6-bit representation, resulting in a bit stream having 6-bit orientation;

computer-readable code configured to cause a computer processor to compress the resulting bit stream of 6-bit data; and computer-readable code configured to cause a computer processor to converting each 6-bit representation in the resulting bit stream into a 8-bit ACARS character, thereby generating a bit stream of 8-bit ACARS characters.

24. The computer program product of claim 23, further comprising:

computer-readable code configured to cause a computer processor to process the generated bit stream of 8-bit ACARS characters by converting each 8-bit ACARS character into a 6-bit representation, thereby generating a bit stream of 6-bit data;

computer-readable code configured to cause a computer processor to de-compress the resulting bit stream of 6-bit data; and computer-readable code configured to cause a computer processor to encode each 6-bit representation into a 8-bit character, resulting in a bit stream of 8-bit character-oriented user data.

25. The computer program product of claim 24, further comprising:

computer-readable code configured to cause a computer processor to encrypted/authenticate the bit stream of compressed 6-bit data; and computer-readable code configured to cause a computer processor to decrypt/authenticate the de-compressed bit stream of 6-bit data.

26. The computer program product of claim 23 wherein the computer-readable code configured to cause a computer processor to compress the resulting bit stream of 6-bit data further comprises a standard compression algorithm.

27. The computer program product of claim 26 wherein the standard compression algorithm further comprises one of a DEFLATE algorithm and a v.42bis algorithm.

* * * * *